June 10, 1941.　　J. B. ARMITAGE ET AL　　2,244,985

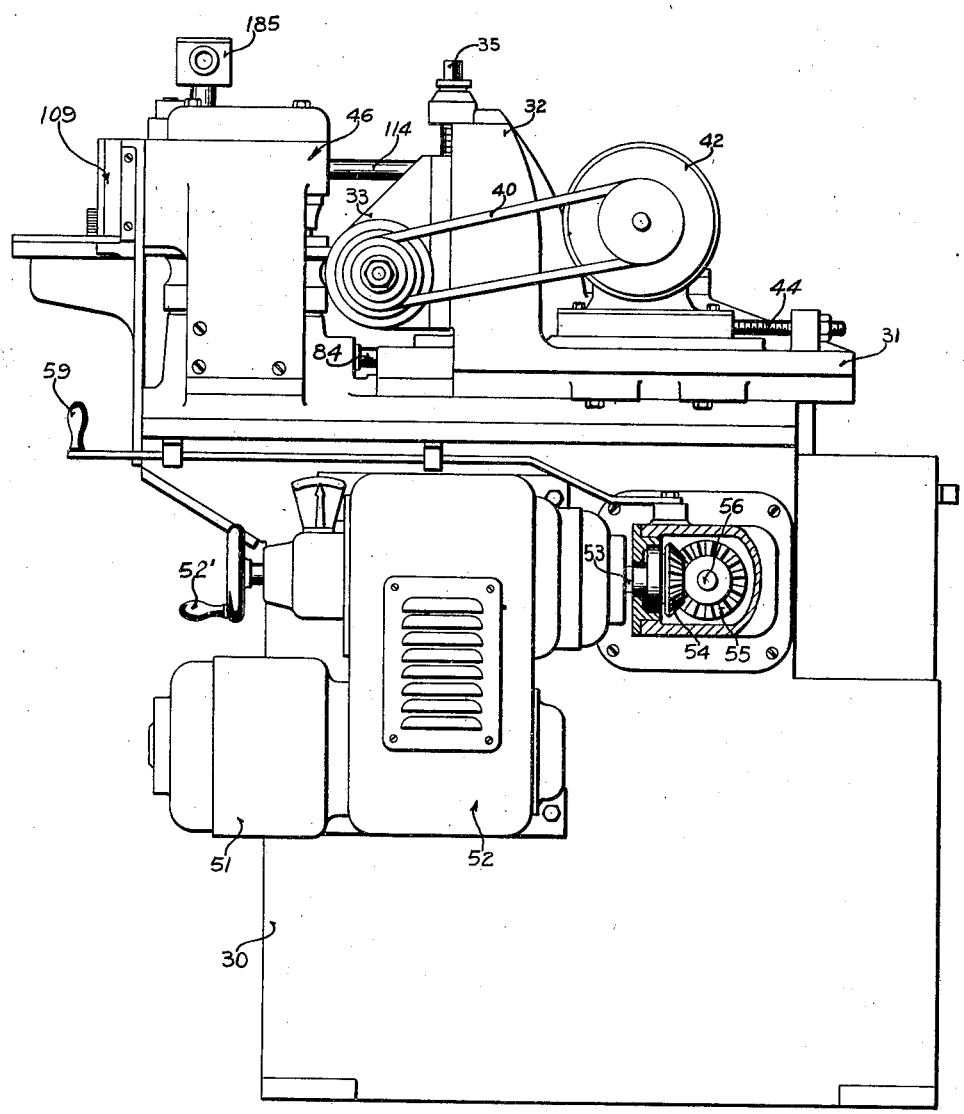

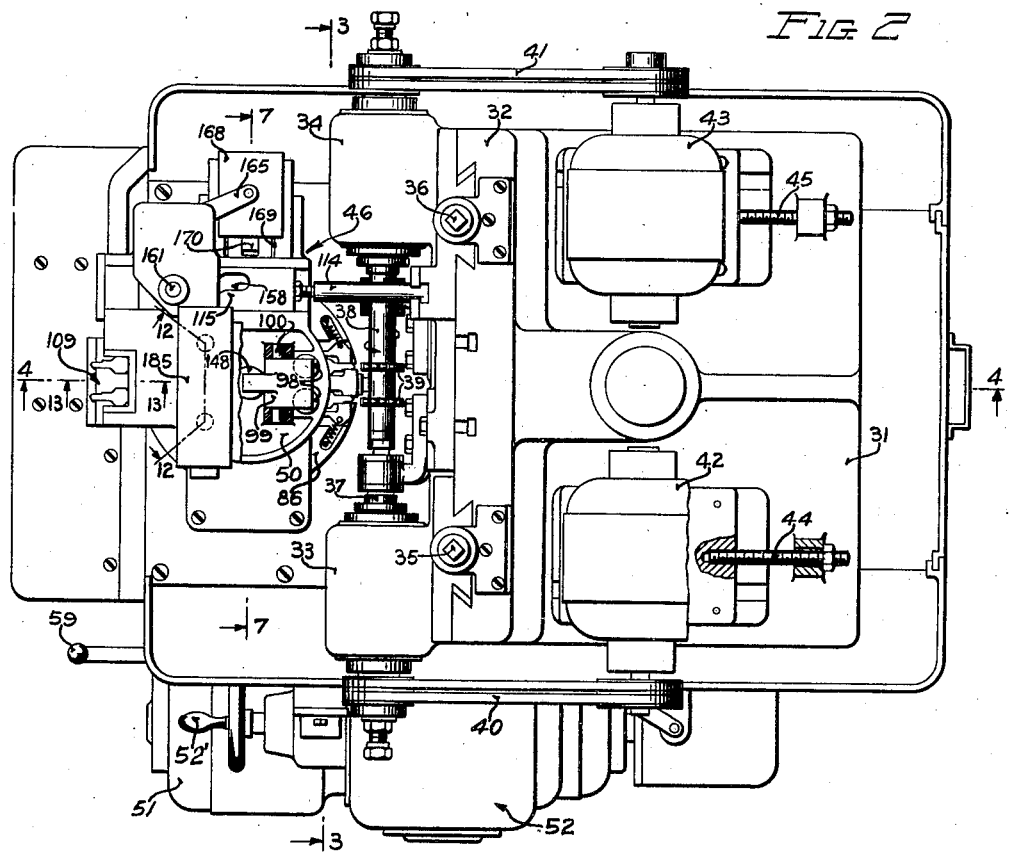

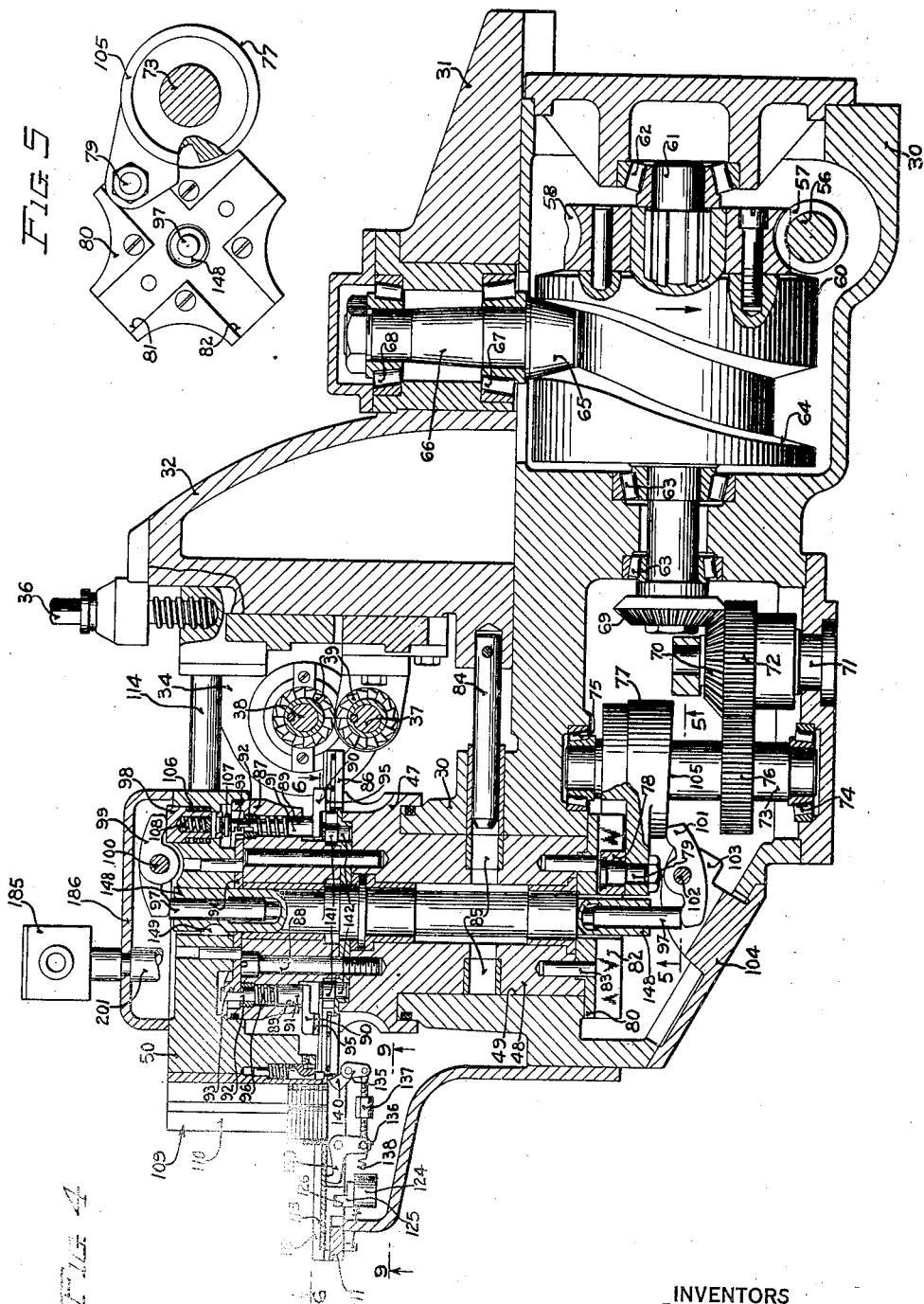

MACHINE TOOL

Filed Oct. 30, 1937　　11 Sheets-Sheet 4

INVENTORS
JOSEPH B. ARMITAGE
JOSEPH J. LENERT
BY W. D. O'Connor
ATTORNEY

June 10, 1941. J. B. ARMITAGE ET AL 2,244,985
MACHINE TOOL
Filed Oct. 30, 1937   11 Sheets-Sheet 5

INVENTORS
JOSEPH B. ARMITAGE.
JOSEPH J. LENERT
BY W. D. O'Connor
ATTORNEY

June 10, 1941.  J. B. ARMITAGE ET AL  2,244,985
MACHINE TOOL
Filed Oct. 30, 1937   11 Sheets-Sheet 6
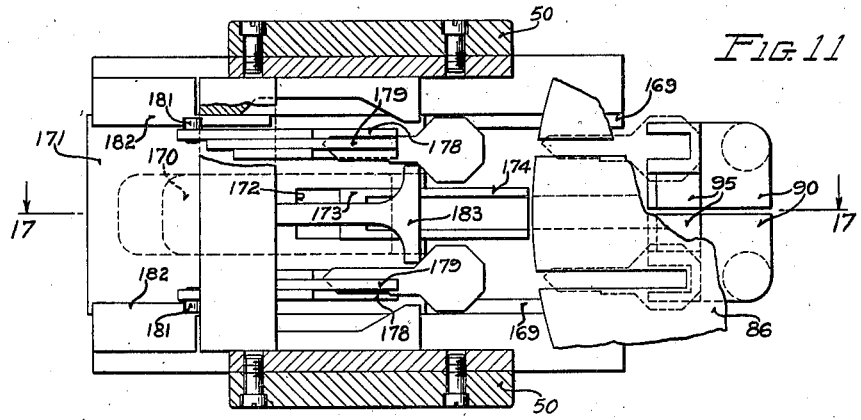
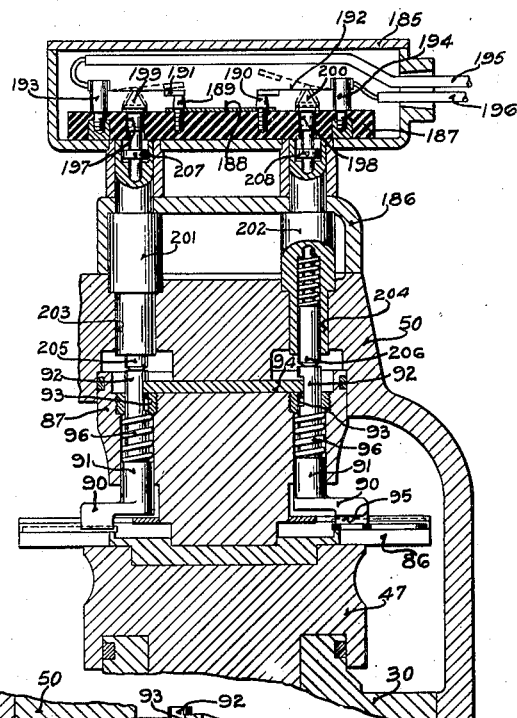
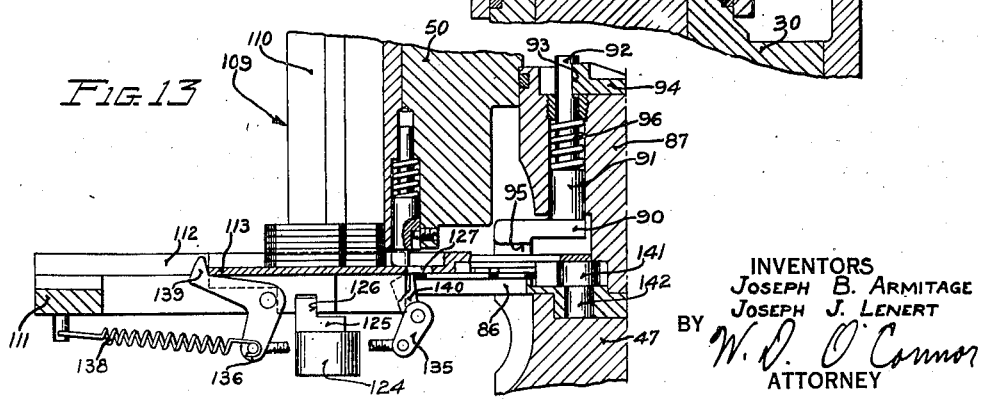
INVENTORS
JOSEPH B. ARMITAGE
JOSEPH J. LENERT
BY W. D. O'Connor
ATTORNEY June 10, 1941. J. B. ARMITAGE ET AL 2,244,985
MACHINE TOOL
Filed Oct. 30, 1937 11 Sheets-Sheet 7
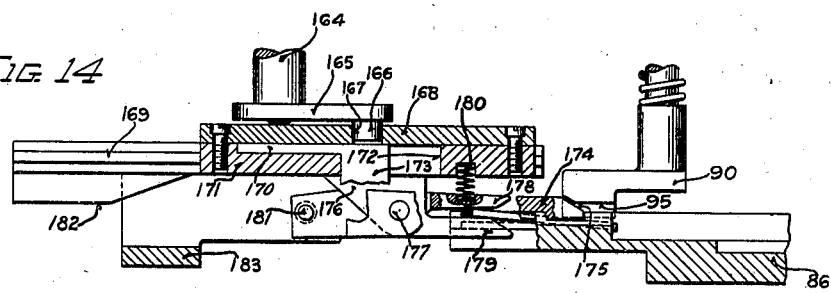
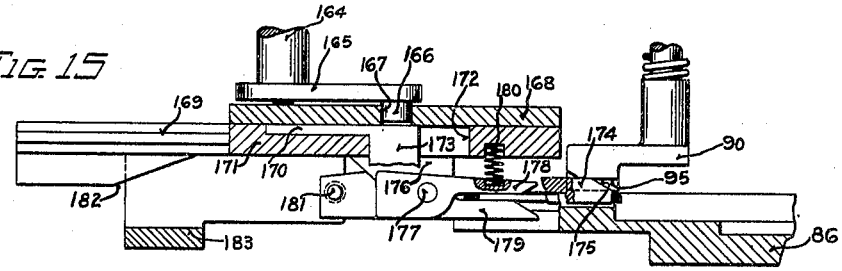
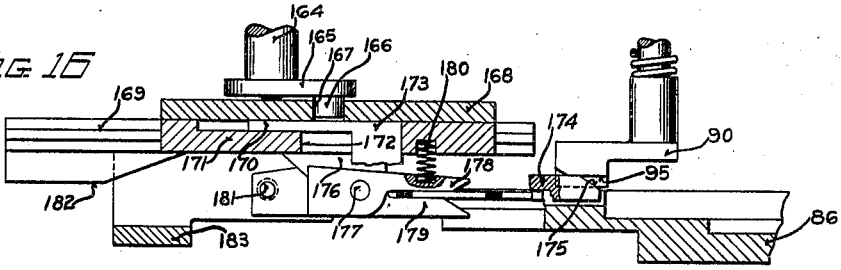
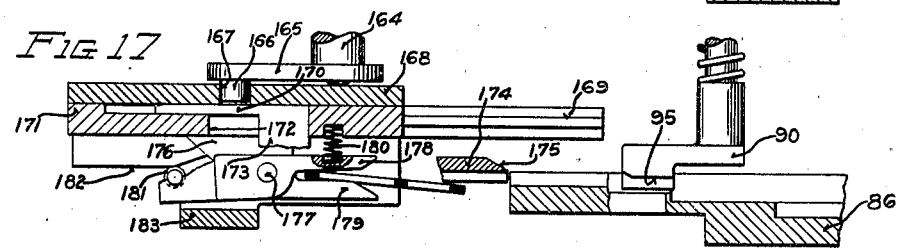
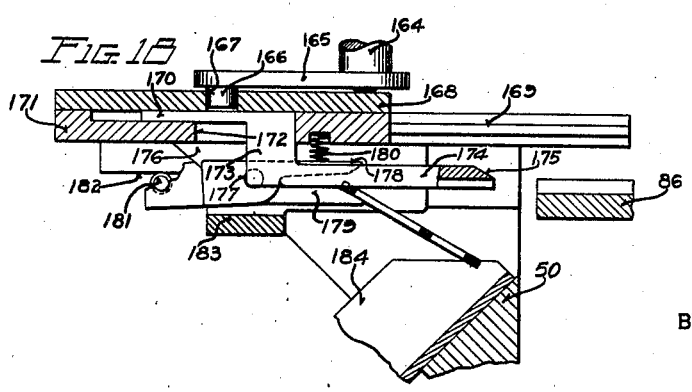
INVENTORS
JOSEPH B. ARMITAGE
JOSEPH J. LENERT
BY W. D. O'Connor
ATTORNEY

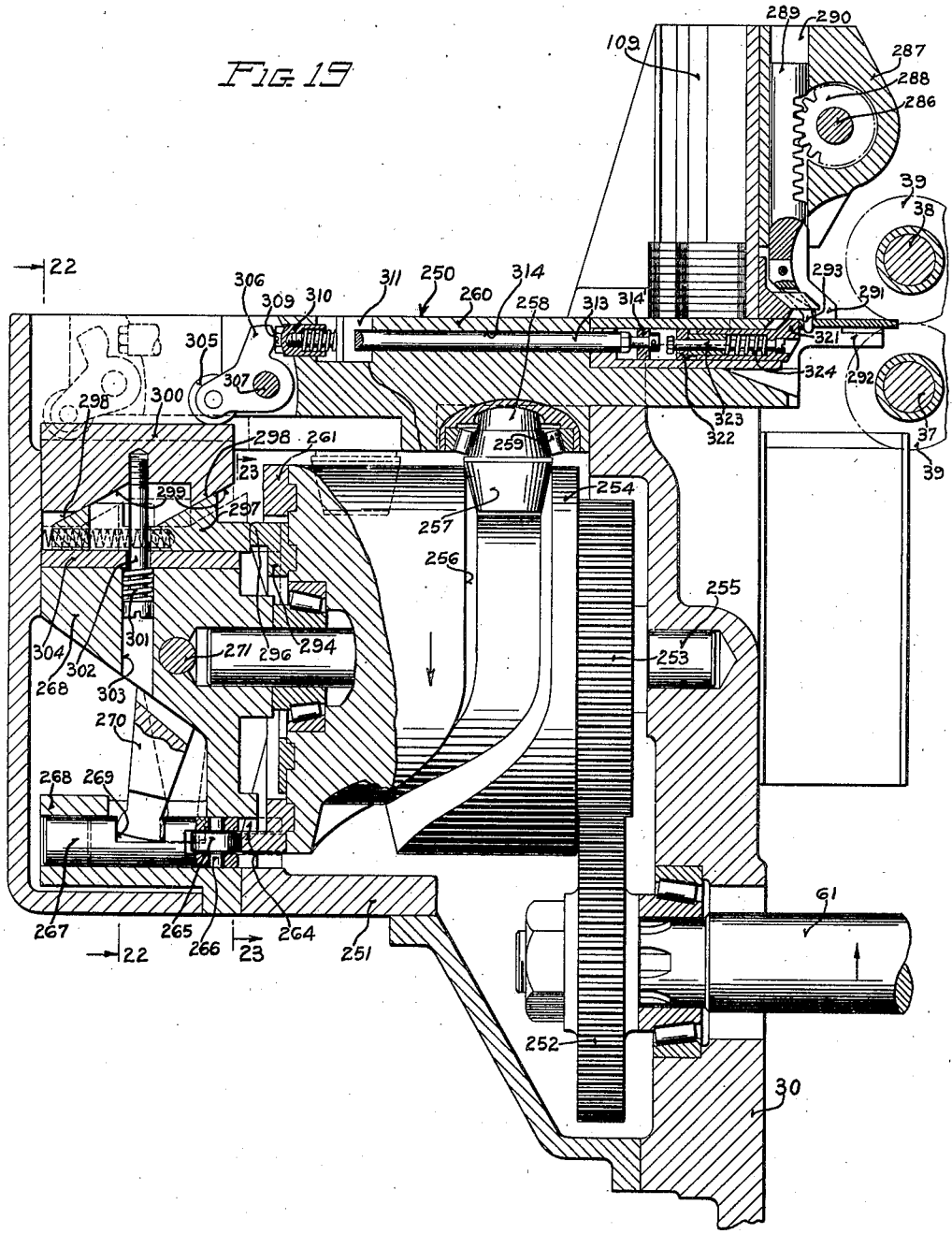

June 10, 1941.  J. B. ARMITAGE ET AL  2,244,985

MACHINE TOOL

Filed Oct. 30, 1937  11 Sheets-Sheet 9

INVENTORS
JOSEPH B. ARMITAGE
JOSEPH J. LENERT
BY W. N. O'Connor
ATTORNEY

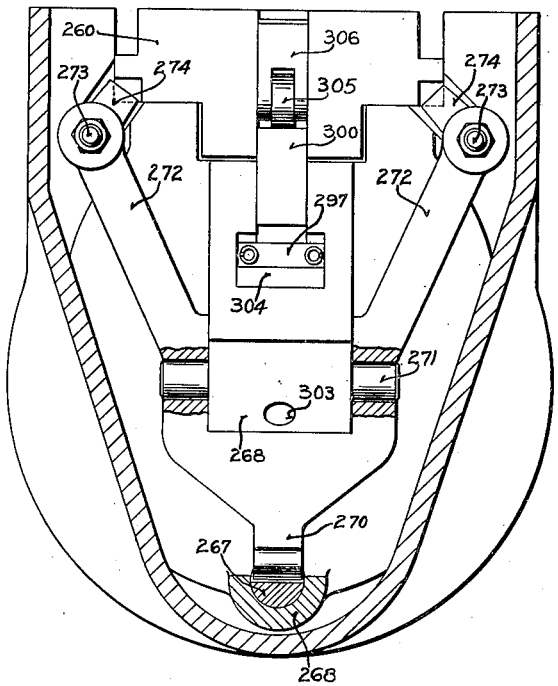
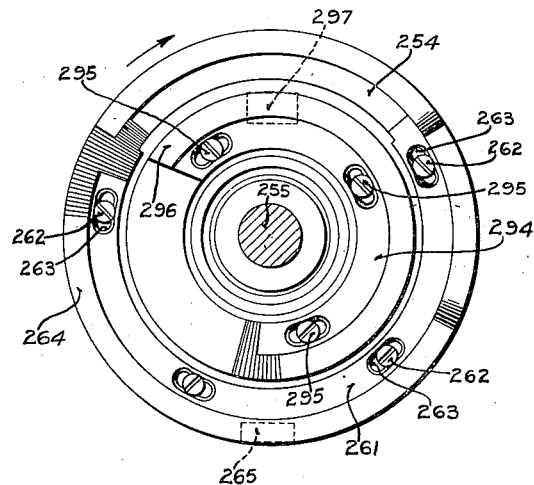

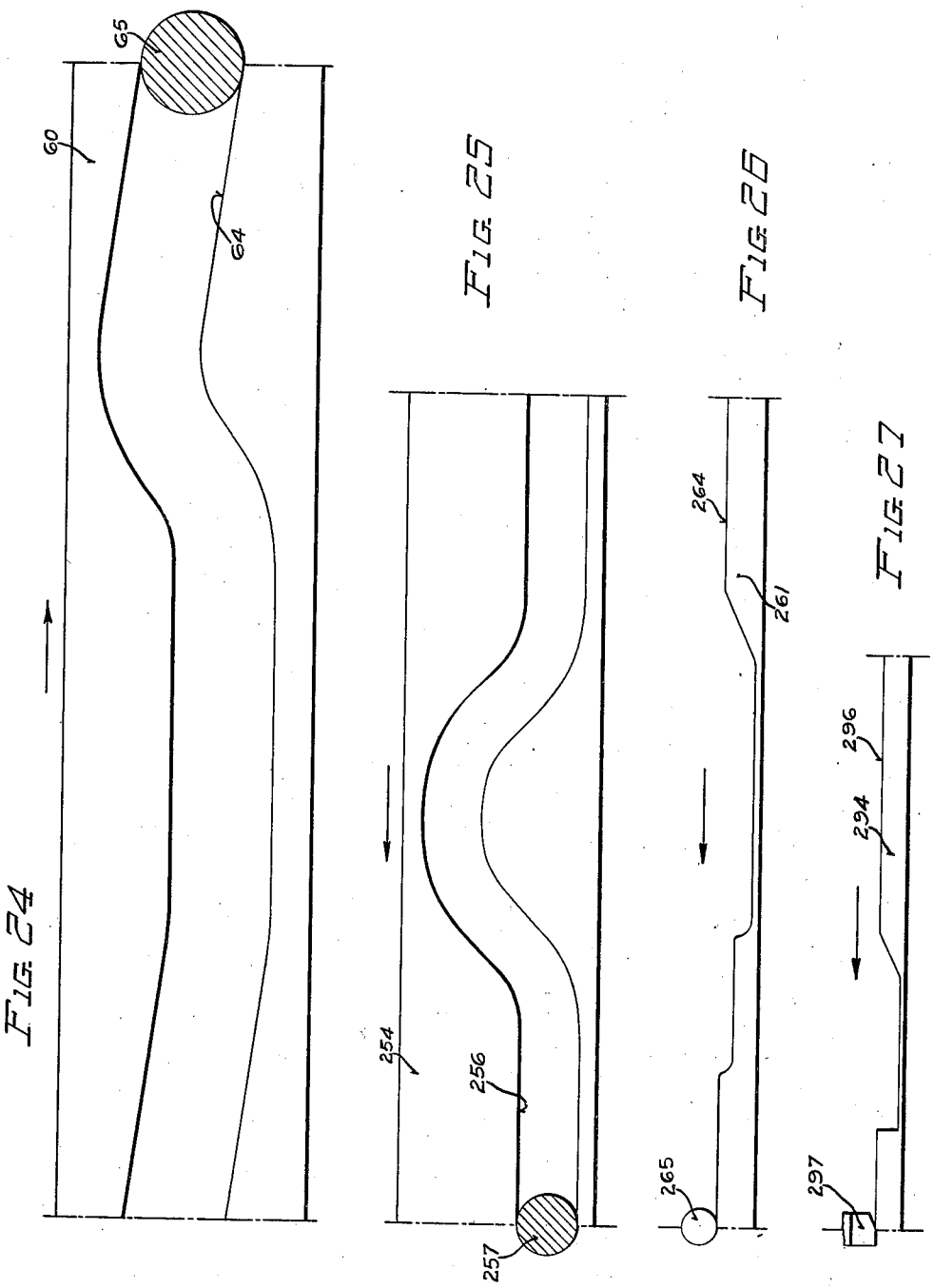

Patented June 10, 1941

2,244,985

UNITED STATES PATENT OFFICE 2,244,985

MACHINE TOOL

Joseph B. Armitage, Wauwatosa, and Joseph J. Lenert, Milwaukee, Wis., assignors to Kearney & Trecker Corporation, West Allis, Wis., a corporation of Wisconsin Application October 30, 1937, Serial No. 171,968

22 Claims. (Cl. 90—21)

This invention relates generally to machine tools and more particularly to a machine tool capable of automatic operation.

A general object of the invention is to provide a machine tool adapted to repeat continuously an automatic operating cycle that includes loading, cutting, and discharging successive workpieces.

Another object of the invention is to provide an automatic machine tool especially adapted to effect grooving operations on relatively thin workpieces.

Another object of the invention resides in new and improved means for effecting magazine loading of a workpiece fixture.

Another object resides in new and improved means for indexing a workpiece fixture, for clamping a workpiece in the fixture, for presenting it in proper position in the path of a movable cutter, and for indexing the fixture to an unloading or ejecting station.

Another object resides in the provision of new and improved means for effecting reciprocation of a cutter.

Another object resides in the provision of new and improved means for effecting feeding of workpieces from a loading magazine to a workholding fixture.

Another object resides in the provision of new and improved means for clamping a workpiece on a fixture in cooperating relationship with a cutter.

Another object resides in the provision of new and improved means for unloading or ejecting finished workpieces from a fixture.

A further object resides in the provision of new and improved means for projecting a workpiece from a magazine onto a movable fixture, clamping the same in position to be operated upon by a movable cutter, retracting the movable cutter at the completion of the cutting operation, and effecting the discharge of the finished workpiece from the work-holding fixture.

A further object resides in the provision of new and improved electrically operated stop mechanism for insuring against the feeding of more than a single workpiece, or for preventing attempted feeding of a workpiece should one fail to be ejected at the proper station.

Other objects and advantages will become manifest from the following description of illustrative embodiments of the present invention, shown in the accompanying drawings.

In the drawings:

Figure 1 is a side elevational view of a machine tool embodying the present invention.

Fig. 2 is a top plan view of the machine shown in Figure 1.

Fig. 3 is a vertical sectional view on the line 3—3 of Fig. 2 showing adjustable cutter spindles mounted on a sliding head.

Fig. 4 is a vertical longitudinal sectional view on the line 4—4 of Fig. 2, showing feed drive, indexing, workpiece feeding, and workpiece clamping mechanisms;

Fig. 5 is a horizontal sectional view on the line 5—5 of Fig. 4 showing a Geneva movement for indexing the work-holding fixture;

Fig. 11 is a horizontal sectional view on the line 11—11 of Fig. 7 showing a bottom view of the workpiece ejector mechanism including the workpiece stripper element;

Fig. 12 is a vertical sectional view on the line 12—12 of Fig. 2 showing the electrical safety stop mechanism;

Fig. 13 is a vertical sectional view on the line 13—13 of Fig. 2, showing the workpiece feeding mechanism in loading position;

Figure 20:
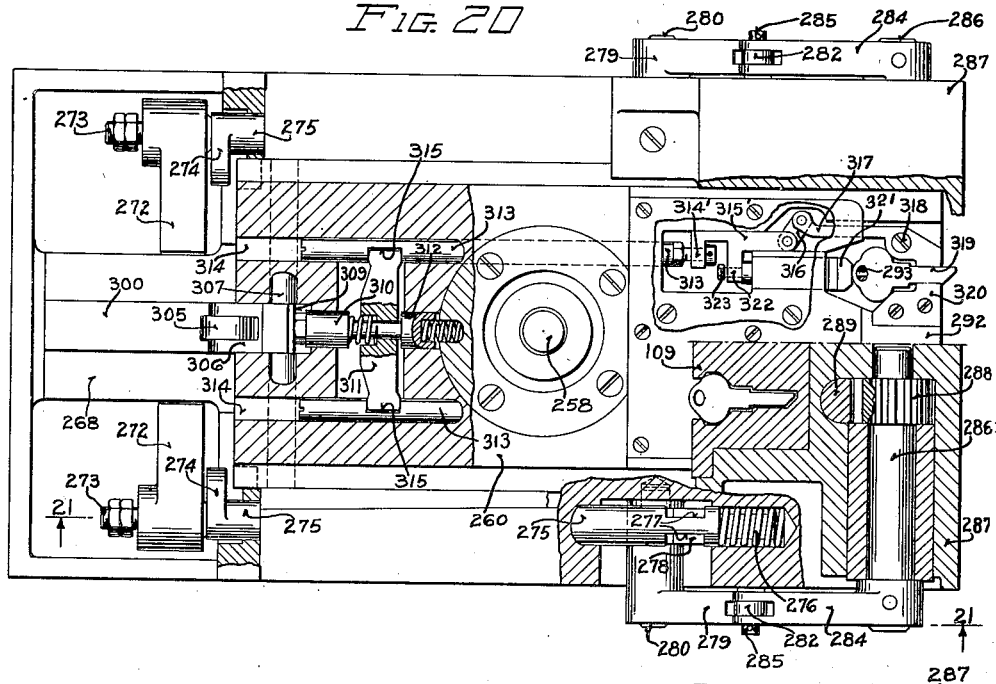

Figs. 14 to 18 inclusive are vertical sectional views through the workpiece ejector mechanism showing successive steps in the removal of the finished workpiece from the fixture; Figure 14 illustrates the initial engagement of the workpiece retracting mechanism; Figure 15 illustrates completion of the gripping engagement of the workpiece and the complete removal of clamping pressure thereon; Figure 16 illustrates the retracting action of the ejector mechanism; Figure 17 illustrates the release of the gripping engagement with the workpiece and a contact between it and the stripper element; and Figure 18 illustrates the cam release of the gripping pressure to permit gravity discharge of the workpiece into a chute;

Fig. 19 is a vertical sectional view through a modified form of workpiece feeding fixture embodying the present invention;

Fig. 20 is a top plan view of the fixture shown in Fig. 19 with parts broken away to more clearly disclose the structure.

Figure 21:
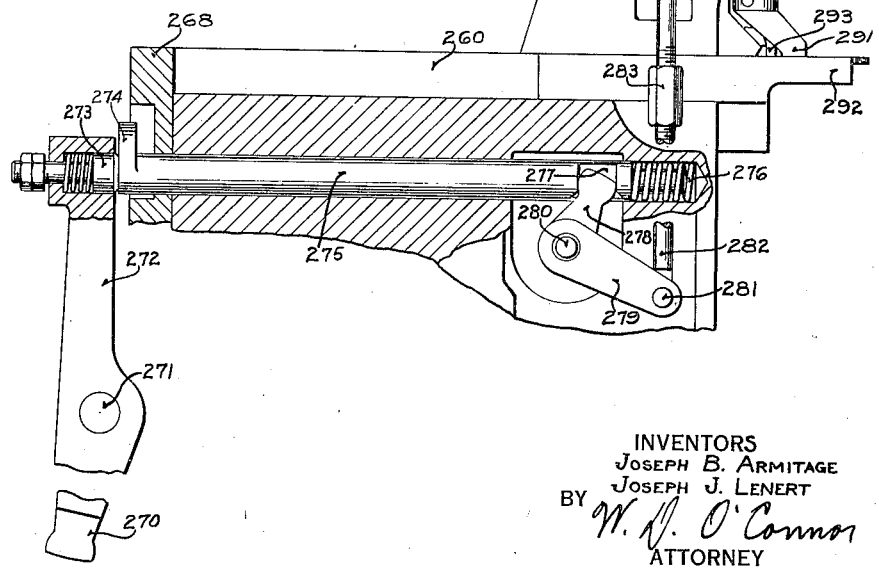

Fig. 21 is a vertical sectional view on the line

21—21 of Fig. 20 showing work-clamping mechanism;

Fig. 22 is a vertical sectional view on the line 22—22 of Fig. 19 showing a portion of the workpiece clamping mechanism for effecting vertical pressure;

Fig. 23 is a vertical sectional view on the line 23—23 of Fig. 19 showing workpiece clamping cams for effecting vertical and lateral clamping of the workpiece;

Fig. 24 shows a development of the cam for effecting cutter reciprocation;

Fig. 25 shows the development of a cam for effecting reciprocation of the workpiece feeding slide;

Fig. 26 shows a development of a cam for effecting the application of vertical clamping pressure to the workpiece; and Fig. 27 illustrates the development of a cam for effecting lateral clamping pressure on the workpiece.

The embodiment of the invention shown in Figs. 1 to 18 inclusive of the accompanying drawings as illustrative of apparatus constituting a practical application of the principles of the invention, is an automatically operating milling machine particularly adapted to perform grooving operations on small workpieces such as lock keys. In general, the machine includes a rotatably indexible work-holding fixture with associated automatic feeding, clamping, and ejecting mechanisms cooperating to present successive workpieces to grooving cutters. The cutters are carried by a slidably mounted cutter supporting head which is actuated through cutting strokes in synchronized relationship with movement of the indexible work fixture in manner to effect completely automatic co-ordinated operation.

As best shown in Figs. 1, 2, and 3, the automatic milling machine comprises a base 30 upon which is mounted a sliding plate or tool supporting carriage 31 having an upwardly extending head portion 32 supporting a pair of vertically adjustable cutter spindle heads 33 and 34. Individual vertical adjustment of the cutter spindle heads 33 and 34 may be effected by means of a hand crank applied to the squared ends of elevating screws 35 and 36 respectively to position the spindle heads respectively for operating upon opposite sides of a workpiece. After proper adjustment of the cutter spindle heads has been effected, they may be clamped in position in any suitable manner.

As best shown in Fig. 3, the cutter spindle heads 33 and 34 are provided with cutter arbors 37 and 38 respectively, each carrying suitably formed cutters 39. The arbors 37 and 38 are driven by means of suitable V-belt drives 40 and 41 respectively, which in turn are driven by electric motors 42 and 43. These motors are mounted on pads formed on the upper face of the sliding plate 31 and they may be adjustably positioned manually by the operation of screws 44 and 45 respectively. Each of the screws is adapted to be retained in the desired position of adjustment by the tightening of a jam nut. The adjustment of these motors is provided to permit the take-up of slack caused by stretching of the V-belts 40 and 41.

A workpiece supporting fixture, generally designated by the numeral 46, is mounted upon the base 30 adjacent to the slide 31. As best shown in Fig. 4, the fixture 46 comprises an indexible workpiece holder or body portion 47 having a shank 48 journaled in a bore 49 in the bed 30.

A stationary cap element 50 suitably mounted on the base 30 serves to house the moving parts of the workpiece fixture 46.

The transmission for effecting co-ordinated movement of the slide 31 and for indexing the workpiece holder 47 is driven by an electric motor 51 mounted on the side of the base 30. The motor shaft drives one element of a variable speed transmission unit of well-known form, generally indicated by the numeral 52. A shaft 53 constituting another element of the variable speed transmission unit 52 may be driven thereby selectively at suitable predetermined speed by manual adjustment of a handwheel 52', the speed of the shaft 53 being indicated by the position of a finger cooperating with an indicator plate. A shaft 56 is driven from shaft 53 by means of a pair of bevel gears 54 and 55 respectively. A manually operable starting lever 59, positioned at the front of the machine for the convenience of the operator, serves to effect the operation of a clutch for engaging or disengaging the driving power connection from the gear 55 to the shaft 56. A worm 57 (Fig. 4) keyed to the shaft 56 drives a worm wheel 58 which is secured by cap screws to the end of a drum cam 60 splined on a shaft 61 that is journaled in roller bearings 62 and 63 in the base 30 of the machine. The drum cam 60 is provided with a circumferential groove 64 which forms a path for a cam follower 65, mounted on a vertically disposed stub shaft 66 journaled in suitable roller bearings 67 and 68 in the cutter carrying slide 31. The groove 64 on the drum cam 60 is designed to effect predetermined feeding and retracting movements of the cutters 39 to and from the workpiece.

Indexing movement of the workpiece holder 47 is likewise effected from the same driven mechanism through a bevel gear 69 fixed to the inner end of the shaft 61. Bevel gear 69 meshes with and drives a mating bevel gear 70 mounted on a vertically disposed shaft 71 which also carries a spur gear 72. The spur gear 72 meshes with a mating spur gear 76 fixed on a shaft 73 which is journaled in suitable roller bearings 74 and 75 in the base 30. An arm 77 fixed to the shaft 73 is provided at its outer end with a roller 78 carried by a stub shaft 79 which is fixed in the arm 77 by means of a clamping nut. The arm 77 and roller 78 serve as the driver of a Geneva movement, the cooperating driven element of which is a slotted disc 80 (shown in Fig. 5). The driven disc 80 is provided with a pair of grooves 81 and 82 disposed at right angles to each other and adapted to receive and cooperate with the driving roller 78 in effecting successive indexing movements of ninety degrees for each complete revolution of the shaft 73. The Geneva disc 80 is fixed to the shank 48 of the workpiece holder 47 in any suitable manner, such as by means of dowel pins 83.

In performing the automatic milling cycle, it is desirable that the indexing movement of the workpiece holder and the advance of the cutter spindles be synchronized in a manner to effect the proper operation of presenting the workpieces to the cutter elements in proper timed relationship. While the synchronizing of the cutter movement and the indexing of the workpiece is obtained with a fair degree of accuracy through the gear train, it is desirable to insure a more exact relative positioning between the workpiece holder and the cutters at the time that the cutting operation occurs. This exact positioning is obtained by means of a pin 84, anchored in the sliding plate 31 and slidably mounted in a suitable bearing in the base 30, in manner to be inserted successively into each of four apertures 85 disposed at right angles in the shank 48 of the workpiece holder 47, as the holder is positioned in each of its four operating positions. As shown, the head of the pin 84 is slightly tapered to permit ready entry into the apertures 85 and it is closely fitted therein to lock the workpiece holder 47 positively against any rotative movement while the cutters are advancing into or being retracted from the workpiece.

A workpiece-receiving platen 86 is fixed to the workpiece holder 47 in any suitable manner. This workpiece platen comprises a disc recessed at ninety-degree intervals for the receipt of workpiece holding, positioning, and clamping mechanisms to be hereinafter more specifically described. These recessed portions of the platen 86 are presented successively to four stations, namely, a loading station, an idle or clamping station, a cutting station, and an unloading station, by the indexing movement of the workpiece holder 47.

A sleeve element 87 is fixed to the workpiece holder 47 by means of cap screws 88 which also serve as the anchoring means for the platen 86. The sleeve 87 is provided with a plurality of pairs of bores 89, each of which is adapted to receive and retain clamping or pressure elements 90 slidably mounted therein. Each pressure element 90 comprises a shaft 91 for sliding engagement with the bore 89, and a reduced shank portion 92 extending upwardly through a positioning nut secured in the element 87. The upper end of the shank 92 is provided with a transverse groove or slot 93 which engages the peripheral edge of a stationary cam plate 94, that is fixed to the housing 50 of the workpiece fixture 46. The lower extremity of each pressure element 90 is provided with an offset clamping foot 95 adapted to overlie a workpiece after it has been introduced onto the platen 86 at the loading station. The co-action between the cam plate 94 and the grooves 93 in the pressure elements 90 effect timed lowering and raising of the pressure feet 95 to thereby effect the application of vertical clamping pressure, or the release thereof from the workpiece. A coil spring 96, which abuts the retaining nut and the shoulder formed between the shank 92 and the shaft 91 of each pressure foot, normally serves to hold the pressure foot in contact with the workpiece, with the result that the cam effects the release of clamping pressure upon the workpiece as the groove 93 rides upon the raised cam surface of the plate 94.

Means for applying additional clamping pressure on the workpieces is provided at the cutting station. This additional clamping means comprises a vertically disposed shaft 97 which extends axially through the pieces 87, 86, 47, and 80 concentrically of the work holder 47. The shaft 97 is housed within sleeve elements throughout the major portion of its length and is normally retained against axial movement by the restraining action of a spring urged plunger 98, which exerts pressure on the outer end of a lever arm 99 that is journaled adjacent its mid-point on a pivot pin 100. Carried by the cap element 50, the inner end of the lever arm 99 being in contact with the upper end of the shaft 97. The lower end of the shaft 97 bears on the inner end of a similar lever 101 fulcrumed intermediate its ends on a pin 102 which is journaled in a pair of spaced lugs 103 formed integral with a cover plate 104 secured in any suitable manner in the base 30 of the machine. The outer end of the lever 101 lies in constant contact with a cam face 105 formed on the lower end of the hub of the Geneva movement driving arm 77. As the lever arm 101 is rocked clockwise on its fulcrum 102 under the action of the cam face 105, the shaft 97 is moved upwardly, rocking lever 99 to move the plunger 98 downwardly, compressing a spring 106 acting on the plunger in the upward direction. Downward movement of the plunger 98 effects corresponding movement of a pressure member 107, which has a pin and slot connection with the plunger 98. A coil spring 108 housed within the plunger 98 serves to normally retain the member 107 in its lower limiting position. Therefore, as the cam surface 105 effects movement of levers 101 and 99 through shaft 97, the pressure member 107 is urged downwardly into contact with the upper extremity of the pressure element 90 carrying the pressure foot 95, which is in engagement with the workpiece at the cutting station. This additional pressure provides sufficient clamping action upon the workpiece to insure against canting of the workpiece under the action of the cutters as they are introduced into or proceed to cut through the workpiece.

The loading mechanism for inserting workpieces successively into the workpiece holder 47 comprises a magazine element 109 which is preferably provided with a plurality of vertically disposed workpiece holding slots 110. The magazine 109 may be removably secured to the stationary element 50 of the workpiece fixture so as to permit a choice of loading the magazine prior to its application to the machine or manually loading it while in position. It should be noted at this point that the workpieces—in this instance, key blanks or the like—are handled in pairs throughout the cycle of operation of the workpiece fixture.

Figure 6:
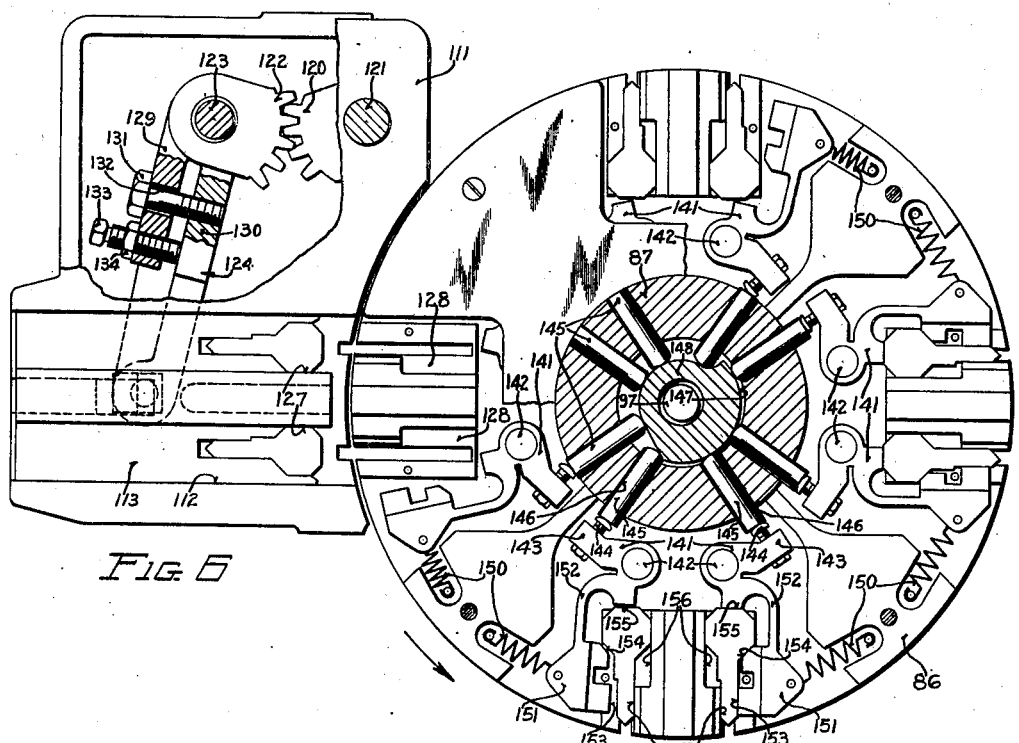
Fig. 6 is a horizontal sectional view on the line 6—6 of Fig. 4 showing the work fixture together with a portion of the feed mechanism and workpiece clamping mechanism.
Figure 7:
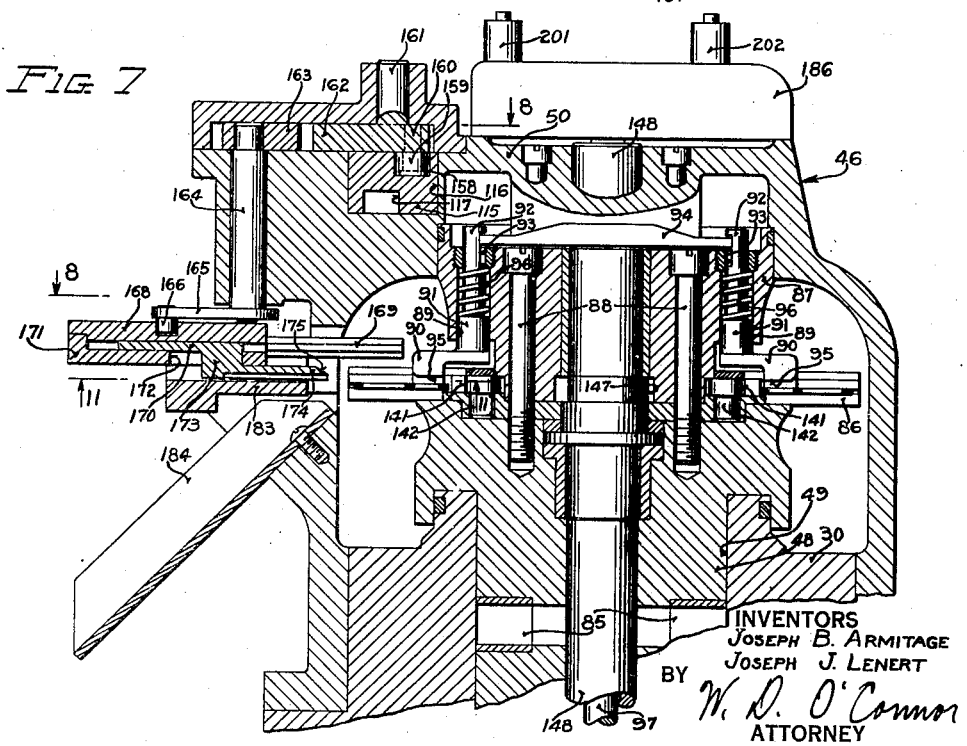
Fig. 7 is a vertical sectional view on the line 7—7 of Fig. 2 showing the workpiece ejector station together with the ejector cam and associated operating mechanisms.
Figure 8:
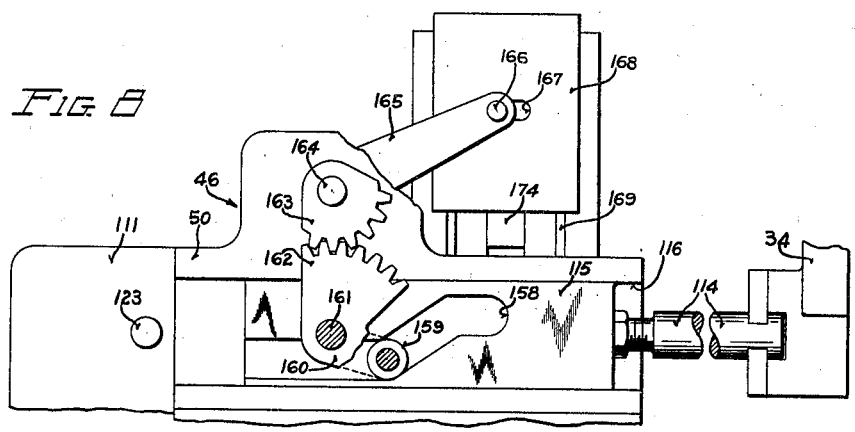
Fig. 8 is a horizontal view on the line 8—8 of Fig. 7 showing the ejector cam and associated operating mechanism.

The loading mechanism, shown in Figs. 4, 6 and 13 of the accompanying drawings, comprises a platform 111 suitably secured to the element 50 of the fixture and lying immediately beneath the loading magazine 109. The loading platform is provided with horizontally disposed guideways 112 adapted to receive and guide a feed plate 113 for reciprocating movement beneath the loading magazine, the feed plate functioning to transfer the keys from the magazine onto the indexible workpiece platen 86. The mechanism for effecting movement of the feed plate 113 (see Fig. 9) in timed relation with the movement of the cutter carrying slide, comprises an actuating bar 114 anchored in any suitable manner in the upright 32 mounted on the slide 31. The forward end of the bar 114 is adjustably anchored in a cam plate 115 adapted to be guided in a suitable groove 116 formed in the stationary element 50 of the workpiece fixture. A cam groove 117 formed in the lower face of cam plate 115 provides a path for a cam follower roller 118 which is pivotally mounted upon a lug 119 of a segmental gear 120. The segmental gear 120 is fulcrumed on a pivot pin 121 which is fixedly mounted in the casting 50. A segmental gear 122, which meshes with gear 120, is mounted on a pin 123 which also carries a lever arm 124 that is provided with an upstanding pin 125 received in a slot 126 in the feed plate 113.

Figure 9:
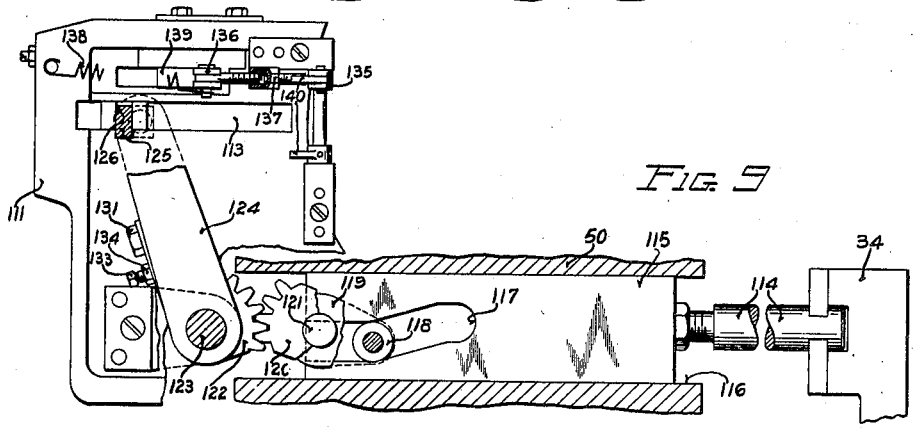
Fig. 9 is a horizontal sectional view on the line 9—9 of Fig. 4 showing the workpiece feed operating cam and associated mechanism.
Figure 10:
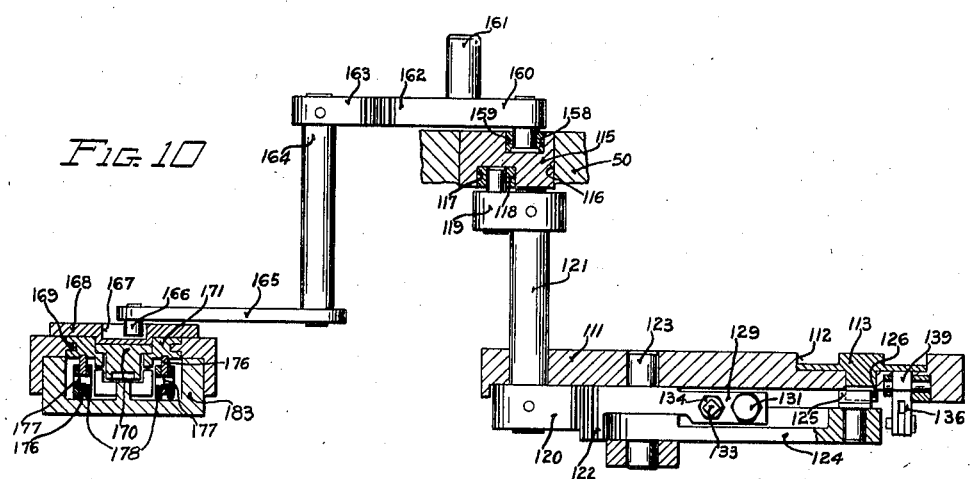
Fig. 10 is a schematic view showing the single cam for effecting feeding and ejecting of the workpiece together with associated mechanisms for effecting both of said operations.

The foregoing mechanism is actuated by movement of the slide 31 toward the workpiece fixture 46 and functions to effect feeding of keys into the workpiece holder 47. As the cam plate 115 is urged inwardly along the groove 116 (to the left as seen in Fig. 9), the cam follower 118 follows the cam groove 117 to effect a counter-clockwise movement of the segmental gear 120, which in turn effects a clockwise movement of the gear 122 to urge the plate 113 forward under the stack of keys carried in the magazine 109. It will be noted in Fig. 6 of the drawings that the forward end of the feed plate 113 is provided with a pair of cut-out portions 127 which provide recesses conforming generally with the contour of the keys to be operated upon. The weight of the keys in the magazine is sufficient to cause the lowermost key in each stack to drop into the cut-out portions 127 when the plate is moved to its rearward position. Then as the plate 113 is urged forward, the pair of keys which have dropped into the openings 127 are urged forward onto a key support 128 formed in a recess of the platen 86, thereby effecting delivery of the keys from the magazine to the indexible workpiece fixture.

It will be noted, referring to Fig. 6 of the drawings, that simple but effective means is provided for adjusting the amount of throw of the plate 113 so as to accurately position the keys on the work support 128. This mechanism comprises a stub arm 129 formed on the segmental gear 122 and a vertically disposed wall 130 provided on the lever arm 124. The lever arm 124, incidentally, is free to rotate on the shaft 123 but for its connection with the stub arm 129 by means of a cap screw 131 extending through an aperture 132 in the arm 129, the cap screw 131 having threaded engagement with an aperture formed in the wall 130 of the arm 124. A set screw 133 is threaded through an aperture adjacent the extremity of the stub arm 129 and is adjustable therein to act in opposition to the cap screw 131 in positioning the arm 124 any desired distance from the arm 129. When proper adjustment has been made between these two arms, the lock nut 134 on the set screw 133 may be tightened to prevent the arms from approaching each other, and the cap screw 131 may also be tightened to prevent separation of the two arms.

Additional mechanism is provided to insure completion of the movement of the keys from the feed plate 113 into proper position upon the workpiece support 128. This mechanism is best shown in Figs. 4 and 13, and comprises a pair of pawl elements 135 and 136, the lower extremities of which are connected by means of an adjustable tie rod mechanism 137. A coil spring 138, which is anchored at one end to member 111, has its other end attached to the lower extremity of the pawl 136. The pawl 136 is provided with an arm 139 which contacts the lower face of the plate 113. When the plate 113 is moved forwardly a sufficient distance to normally position the key above the support 128, the end of the arm 139 passes beyond the rear extremity of the plate 113. The instant this occurs, the spring 138 effects rapid upward movement of both the pawl 136 and the pawl 135 to effect a load-and-fire action of a setting or striking member at the upper end 140 of pawl 135 which strikes the end of the key to insure its proper advance onto the support 128.

After the work fixture 46 has been loaded, the workpiece holder 47 is indexed, by action of the Geneva movement, through an angle of ninety degrees to an idle station. Upon indexing movement of the workpiece holder 47, vertical clamping of the workpiece is effected by the pressure feet 95 as soon as the grooves 93 in the feet carrying elements 90 have moved out of engagement with the raised cam surface of the cam plate 94, as previously explained. Coincidentally, suitable laterally acting key clamping elements 141 are actuated to afford a clamping pressure to retain the key against sidewise or endwise movement on the work support 128, as shown in Fig. 6. The lateral clamping elements 141 are pivotally mounted on pins 142 supported in the platen 86. An arm 143 extending circumferentially is provided with a set screw 144 adapted to engage one extremity of a radially acting push rod or pressure pin 145 which is slidably mounted in an aperture 146 formed in the sleeve member 87. The inner end of the push rod 145 contacts a stationary cam 147 formed on a sleeve 148 which is fixed to the stationary member 50 of the workpiece fixture by means of a key 149. The contour of the cam 147 is such that the push rods 145 are each urged outwardly against the action of a coil spring 150 which has one extremity anchored in the platen 86 and the other anchored to a pin carried by an arm 151 formed integral with each of the clamps 141. The arm 151 is provided with a relatively thin intermediate portion 152 having sufficient spring action to compensate for slight difference in position assumed by the clamping end of the arm under the positive action of the cam 147. As best shown in Fig. 6, the arm 151 is provided with three key contacting surfaces 153, 154, and 155 adapted to contact the key along its shank and head portions to prevent axial movement under a cutting load and also to force the opposite side of the key against abutment faces 156 and 157 which are raised from the key support 128. The keys are held in clamped position until after the completion of the groove cutting operation at the next succeeding station, and until such time as the push rods 145 arrive at a cut-out portion along the cam face, when the rods will be forced inwardly under the action of the coil spring 150 and the lateral clamping pressure released.

On the next successive indexing operation, the keys which have been clamped at the idle station will be presented at the cutting station. Since the clamping action of the elements 141 cooperates with the faces 156 and 157 on the element 128, the keys are retained against either lateral or longitudinal movement as the cutters are advanced into contact with them. After completion of the cutting stroke, which is effected by movement of the cam follower 65 in the cam groove 64 of the cam 60, the head 32 is withdrawn under similar action and the cutters are retracted to a position free of the keys. At this time, the third indexing movement is effected and the keys are presented at the unloading or discharging station of the machine.

The additional clamping mechanism for effecting increased vertical pressure upon the keys, as previously described, remains active throughout approximately three-fourths of the movement of the workpiece holder 47. The inactive portion of the vertical clamping cycle lies between the discharge station and the idle station, which is to say that the pressure elements 90 are retracted from active position only for a distance sufficient to insure proper loading of keys onto the work support 128 on the platen 86.

The key unloading or discharge mechanism is actuated by a cam groove 158 cut in the upper face of the cam plate 115 (see Fig. 3). A cam follower 159 is pivotally mounted adjacent to the end of an arm 160 which is keyed to a stub shaft 161 anchored in the fixed member 50. A segmental gear 162 also carried by this shaft engages a second segmental gear 163 carried by a shaft 164. An arm 165, also carried by the shaft 164, is provided with a depending pin 166 adjacent to its outer end. The pin 166 is adapted to engage a slot 167 formed in a sliding plate 168, the plate 168 being guided for reciprocating movement in ways 169 formed in the stationary element 50 of the fixture 46. A second sliding plate 170 (Figs. 7 and 10) is retained in contact with plate 168 by means of an auxiliary plate 171. The plate 171 is provided with an opening or slot 172 in its lower face adapted to contact the forward and rearward faces of a depending lug 173 formed integral with the plate 170. A foot or wedge member 174, preferably formed integrally with the lug 173, extends forwardly and terminates with a beveled forward end 175 which is adapted to be forced beneath the lower face of the pressure element 90 to relieve the downward clamping pressure effected by it upon the key.

The action of the key unloading mechanism may best be seen by reference to Figs. 14 to 18 inclusive of the drawings. As there shown, the plate 171 is provided with a pair of downwardly extending lugs 176, through which a pivot pin 177 extends. The pivot pin 177 serves as a mounting means for the upper or movable jaw 178 of the key gripping and extracting means. The cooperating lower jaw 179 is formed integrally with and extends forwardly from the lugs 176. The jaw 178 is normally urged downwardly by means of a spring 180 housed within recesses formed in the plate 171 and in the jaw. The rearward end of jaw 178 carries a cam follower roller 181 adapted to contact a cam face 182 formed integral with ways 169. As the shaft 164 is rocked in a counter-clockwise direction, for instance, see Fig. 14, the arm 165 is moved forwardly carrying with it plates 168 and 171 which in turn take up the lost motion between the lugs 173 and the slot 172, thus effecting forward movement of the member 174 to the point where the beveled portion 175 engages the pressure foot 95 to initiate the release of clamping pressure upon the key or workpiece. As the clamping pressure is relieved from the workpiece, the jaws 178 and 179 slide over the workpiece to initiate a gripping action which is utilized to remove the key from the position in which it was retained during the cutting action. Continued forward movement of the plate 168 to its extreme position (as shown in Fig. 15) results in the completion of the elevation of the pressure foot 95 under the action of the member 174 and also moves the jaws 178 and 179 into gripping position upon the workpiece.

As the arm 165 is retracted under clockwise movement of the shaft 164, plates 168 and 171 start their initial rearward movement, which results in retracting the key from beneath the pressure foot 95, until such time as the lost motion between the lug 173 and the slot 172 has been completely traversed (as shown in Fig. 16). Continued movement of the arm 165 then results in withdrawal of the member 174 from contact with the pressure foot 95 and likewise effects continued withdrawal of the workpiece retained in the gripping jaws 178 and 179. The gripping action of the jaws persists until such time as the cam follower 181 engages a cam 182 and moves along its surface to the point where the jaw 178 is rocked on the pivot pin 177 a sufficient distance to compress the spring 180, thus relieving the gripping pressure upon the key. Simultaneously with the release of gripping pressure between the jaws 178 and 179, the enlarged end of the workpiece engages a stripper element 183 (as shown in Figs. 11 and 17). Continued rearward movement of the arm 165 to its extreme rearward position (as shown in Fig. 18) permits the workpiece to drop freely into a chute 184 from the open jaws 178 and 179 under action of the stripper element 183.

An automatic electrical control power cut-off mechanism (shown in Fig. 12) provides means for gauging the workpiece to insure against the possibility of loading more than a single workpiece into the fixture or loading the fixture at all in the event that a workpiece remains in it at the completion of the unloading cycle of the machine. This mechanism comprises a switch box 185 mounted in suitable manner upon a cover portion 186 of the fixture housing 50. A block of insulating material 187 anchored within the box 185 supports a conductor 188 which carries a plurality of contact points 189 and 190. Cooperating spring finger contacts 191 and 192 are supported on mounting posts 193 and 194 respectively. Suitable electrical leads 195 and 196, which form a portion of the power circuit leading to the feed motor 51, are electrically connected to the posts 193 and 194 respectively, in manner to place the spring finger contacts in the circuit in series relationship.

The insulating block 187 is provided with a pair of bores 197 and 198, which are disposed directly beneath the spring finger contacts 191 and 192 respectively. Finger engaging elements 199 and 200 are slidably received within bores 197 and 198 respectively. A pair of sleeve elements 201 and 202 which are supported in bores 203 and 204 respectively in the casting 50 extend upwardly through the cover 186 and are suitably secured to the switch box 185. The sleeves 201 and 202 house spring-urged plunger elements or gauge rods 205 and 206 respectively. The lower extremities of plungers 205 and 206 lie in the path of travel of the shank portions 92 of the pressure elements 90. The downward movement of rods 205 and 206, under spring pressure, is limited by collars 207 and 208 which abut shoulders formed in the sleeve elements 201 and 202. The upper extremity of rods 205 and 206 lie immediately beneath the finger engaging elements 199 and 200 respectively. Rod 205 is positioned between the discharge station and the loading station of the machine, and rod 206 lies between the loading station and the idle station of the machine.

In the event that a workpiece has not been extracted from the platen 86 during the unloading operation at the unloading station, the pressure foot 95 will not be permitted to assume its normal lowermost position due to the thickness of the workpiece remaining on the platen 86. The fact that the workpiece has remained on the platen 86 results in the upper end 92 of the pressure element 90 extending above the normal plane in which it should lie in the absence of a workpiece. This protrusion of the shank 92 is sufficient to cause it to contact the lower extremity of the gauge rod 205 and urge it upwardly against the pressure of a spring which normally retains it in lower extreme position. The upward movement thus imparted to the rod 205 establishes engagement between the upper extremity of the rod 205 and the finger engaging member 199, which in turn effects upward movement of the spring finger carrying contact 191 to break the electrical connection between the last named movable contact and the stationary contact 189, thus interrupting the flow of electrical current to the feed motor 51 to stop the same and thereby interrupt further movement of either the cutter or the fixture. In the event that the workpiece has been removed at the unloading station, the upper end of shank 92 of the pressure element 90 will pass freely beneath the lower extremity of the rod 205 without breaking the electrical contact between contact elements 191 and 189.

In the event that more than a single workpiece has been fed into the machine at the loading station, the upper end of the shank 92 of the corresponding pressure element 90 will project upward a sufficient distance to contact the lower extremity of the spring-urged gauging plunger 206. Contact between the shank 92 and the rod 206 will urge the latter upward to establish engagement between the upper extremity of the rod and the element 200 to force the electrical contact 192 away from the contact 190, thus breaking the electrical connection to cut off the power source of the motor and render the machine idle.

The normal lower extreme position of rod 205 is adjusted to normally permit clearance between it and the upper ends of the shanks 92 of the several pressure elements 90. The clearance is an amount less than the thickness of the workpiece, with the result that when a workpiece remains in the fixture, the upper extremity of the pressure foot will contact the lower extremity of the rod 205 to effect automatic cut-off of the driving power for the machine. The lower extremity of the rod 206 is adjusted to permit clearance between it and the upper ends of the pressure elements when a single workpiece is contacted by the pressure foot. However, should a second workpiece be inadvertently admitted to the fixture, the additional height would be sufficient to effect engagement between the upper extremity of the pressure element and the lower extremity of the gauge rod 206 to effect its elevation thereby breaking contact between elements 192 and 190 to cut off the driving power of the machine.

In summarizing the structural arrangement and the functioning of the mechanisms in effecting grooving of workpieces, a typical cycle of operation of the machine may be effected as follows. After the magazine 109 has been loaded with key blanks or other workpieces, and the motor 51 has been started, the speed of operation of the machine may be adjusted to provide for the desired rate of production by manual manipulation of the speed adjusting handwheel 52', the speed being visually indicated by the position of the finger on the indicator plate. To start the machine, the hand lever 59 is thrown into clutch engaging position, which results in establishing driving connection from the motor 51 to slide 31 and fixture 46 through the variable speed transmission 52, shaft 53, gears 54 and 55, shaft 56, thence to shaft 61 through worm 57 and worm wheel 58. The drum cam 60 and shaft 61 are thus set in motion in a counter-clockwise direction (looking from the right hand end of shaft 61 in Fig. 4). Rotation of the drum cam 60 effects reciprocating movement to the tool carrying slide 31 through action of the cam follower 65, previously described. The bevel gear 69 carried on the left hand end of shaft 61 effects driving motion to the shaft 73 through bevel gear 70 and the pair of spur gears 72 and 76. Rotation of the shaft 73 effects rotary movement of the arm 77 carrying the roller 78 which constitutes the driver for the Geneva movement. The roller 78 successively engages grooves 81 and 82 disposed at right angles in the Geneva plate to effect successive indexing movements of ninety degrees to the movable workpiece holder 47. The idle movement of the roller 78 provides for the dwell between successive indexing operations, the dwell thus provided affording a sufficient lapse of time to effect loading, cutting, and discharging operations. The loading and unloading operations are effected through movement of the slide 31 toward and from the workpiece fixture 46 through sliding action of the cam plate 115 which transmits motion to the loading and discharging mechanisms to the structure previously described.

The operations of the work-clamping mechanisms, which are cam controlled, are effected through two mediums. The means provided for exerting a vertical clamping pressure upon the workpiece prior to and during the cutting operation comprises the cam face 105 formed integral with the Geneva arm 77. The means for effecting release of the clamping pressure comprises the cam plate 94 which is fixedly mounted on the stationary element 50 of the workpiece fixture 46. As the rotatable workpiece holder 47 travels about its axis, the pressure elements 90 are raised by contact of their slots 93 with the elevated portion of the cam plate 94. This action takes place prior to the unloading operation and retains the pressure feet in elevated or inactive position until such time as the loading operation has been completed.

The means for effecting lateral clamping pressure upon the workpieces comprises the cam face 147 formed upon the stationary sleeve element 148. As the workpiece holder 47 rotates, it carries with it the sleeve member 87 in which the radially extending pressure pins 145 are journaled for sliding movement. As the workpiece platen 86 rotates in a counter-clockwise direction (see Fig. 6) the pins 145 are urged outwardly at the completion of the first indexing movement after the loading operation has been completed. The outward movement of the pins 145 effects clamping movement of the arms 151 to retain the key or other workpiece against both lateral and longitudinal movement. The clamping action persists until after the next successive indexing operation, in which position the cutters effect the grooving operation on the key or workpiece. The pins 145 are urged inwardly under the action of the coil springs 159 during the indexing operation from the cutting position to the discharge or unloading station. By means of the mechanism just described, lateral and longitudinal clamping of the workpieces is effectively provided to withstand the action of the cutter upon the relatively thin workpieces. This clamping action, combined with the vertical pressure applied by the pressure feet 95, is sufficient to insure against displacement of the workpieces under the cutting action. After the workpieces have been unloaded from the workpiece platen 86 at the discharge station, the next successive indexing action will present the empty platen at the loading position, where the next succeeding cycle of operation will be commenced with the loading of the workpieces.

Another embodiment of the invention incorporating a modified form of the workpiece holding fixture is illustrated in Figs. 19 to 23 inclusive of the drawings. Fixture 46, previously described, includes the workholder 47 that is indexible to four positions in effecting a complete cycle of operation of the machine. The modified fixture, which is generally indicated by the numeral 250, is of the reciprocating type wherein the workpieces are removed successively from the bottom of the stack contained in magazine 109, identical to that previously described, and are presented in pairs to the action of cutters 39 carried on the spindles 37 and 38, which are actuated in a manner identical to that previously described. The fixture 250 comprises a body portion 251 adapted to be secured to the base 30 of the machine in any approved manner. A spur gear 252 mounted on the splined end of shaft 61 drives a mating spur gear 253 which is fixed to one end of a drum cam 254. The drum cam 254 is provided with roller bearing mountings on a shaft 255 fixed in the portion 251. A circumferential cam groove 256 formed in the drum 254 provides a track for a cam follower 257 formed integral with a stub shaft 258, which is journaled in roller bearings 259 in a sliding plate 260 adapted to be guided for reciprocation in suitable ways formed in the bottom portion 251 of the fixture 250 for effecting feeding of the workpiece to the cutters.

To provide for clamping the workpieces in position to be engaged by the cutters, a ring cam 261 is mounted for angular adjustment on the other end of the drum cam 254 by means of cap screws 262 which pass through slots 263 formed in the cam 261 (Fig. 23). When the cam has been adjusted to the desired angular position with respect to the drum cam 254, it may be anchored in position by tightening the cap screws 262. The cam 261 is provided with an elevated cam face 264 adapted to impart movement to a cam follower 265 carried by a pin 266 which is mounted in the bifurcated feed portion of a rod 267 that is slidably mounted for reciprocating movement in a member 268 associated with the body portion 251 on the fixture 250. A transverse slot 269 formed in the rod 267 is adapted to receive the lower end of an arm or lever 270 which is fulcrumed on a pin 271 in the member 268. The upper end of the arm 270 is bifurcated (Fig. 22), forming arms 272 which extend upward and outward from the pin 271. A spring-urged plunger 273 (Fig. 21) is retained within a socket in the upper extremity of each of the arms 272.

As the cam follower 265 rides to the elevated portion 264 of the cam 261, the rod 267 is urged rearward effecting clockwise movement of the lever 270, as shown in Fig. 19. This clockwise movement of the lever 270 exerts pressure on the spring-urged members 273, which contact feet 274 formed on the outer extremity of the push rods 275 journaled in the sliding member 260. The rods 275 terminate in reduced inner ends, which serve to retain coil springs 276 that tend to resist the inward movement of the arms 272. These coil springs 276 permit a take-up to prevent breakage which might occur as a result of excess motion of the actuating element. Slots 277 formed in each of the rods 275 serve to receive and actuate one arm 278 of a bell crank 279 which is fulcrumed on a pin 280. The other arm of the bell crank 279 carries a pin 281 on which the lower end of a tie rod 282 is mounted. The tie rod 282 is preferably formed in two parts joined by a take-up nut 283 adapted to adjust the throw of a lever arm 284 to which the upper end of the rod 282 is connected by a pin 285. The arm 284 is anchored on a shaft 286 which is journaled in a head 287, which lies adjacent to the magazine 109. The shaft 286 is provided with a pinion 288 (Figs. 19 and 20) which meshes with a rack 289 mounted for vertical movement in a bore 290 in the head 287. The lower extremity of the rack 289 terminates in a pressure foot 291 adapted to contact the upper surface of a workpiece supported by a forwardly extended surface or member 292 formed on the sliding member 260. The lower extremity of the rack 289 is also provided with means for removably retaining a locating and extracting pin or element 293, the operation of which will be hereinafter more specifically described.

A second cam plate 294 (Fig. 23) is also mounted for adjustable positioning on the drum cam 254 by means of cap screws 295. This cam plate is provided with a raised cam surface 296 adapted to effect movement of a spring-urged cam follower 297 which is retained in constant contact with the face of the cam 294. The cam follower 297 is provided with a pair of angularly disposed pressure faces 298 which contact complementary faces 299 formed on a block 300 that is mounted for vertical movement in suitable ways formed in the member 268. The block 300 is urged downwardly under the action of a coil spring 301 which surrounds a cap screw 302 having one end threaded into the block 300 and having its head end slidably mounted in a bore 303 formed in the member 268. The pressure of the spring 301 is effected against the head of the screw 302 at one end and at its other end against a fixed plate 304 through which the screw 302 extends.

The upper surface of the block 300 is engaged by a roller 305 mounted on a pin carried by a bell crank lever or arm 306 which is fulcrumed on a pin 307 carried by the sliding plate 260. A face 308 on the lever 306 contacts a spring-urged plunger element 310 which passes through a laterally extending yoke 311 and terminates in a bore 312 in the piece 260. A pair of push rods 313 are slidably mounted in suitable bores 314 disposed laterally at the respective sides of the bore 312. The rods 313 are provided with vertically disposed slots 315 adapted to receive the ends of the yoke 311. The forward ends of the rods 313 are adjustably secured, by means of cap screws, to lugs 314' formed on a sliding member 315'. The forward end of the member 315' is pivotally engaged with a connecting link 316 which is pivotally connected to one end of a clamping member 317 that is fulcrumed intermediate its ends on a pin 318. The forward end of the member 317 is provided with a clamping surface 319 which abuts the workpiece to effect a lateral clamping pressure between it and a stationary plate 320 which is anchored on the member 292. Longitudinal pressure is also effected on the end of the key by means of a plunger 321 which is slidably mounted in a plate anchored in the slide 260. The rearward end of the plunger 321 is secured to a lug 322 which is also formed on the sliding member 315'. A pin 323 connects the plunger 321 with the lug 322. A coil spring 324 which surrounds the pin 323 serves to compensate for overtravel of the clamping plunger 321 to prevent breakage of the pressure member.

Movement of the tool supporting slide 31, fixture slide 260, and operation of the several clamping members, is effected by cams 60, 254, 264, and 296. Cams 60 and 254 are mounted on shafts 61 and 255 respectively, and are driven thereby to effect reciprocation of the tool slide 31 and the fixture slide 260 respectively. These cams form integral parts of the motion transmitting gear train which is otherwise identical with that disclosed in Figs. 1 and 2 of the drawings.

A cycle of operation of the modified form of the invention just described will disclose the sequence of operation required to load a lock key from the magazine 109, advance the same into a cutting position, clamp the same in cutting position during the advance and retraction of the cutting tools, release the clamping pressure upon the workpiece and retract the extracting pin 293 to effect the unloading or stripping of the key upon the completion of the cutting operation. The drive for effecting rotation of the shaft 61 originates with the motor 51, which transmits power through the variable speed transmission 52 to the shaft 53 of the same, from which shaft 56 is driven by means of a pair of bevel gears. The shaft 56 is provided with a worm 57 which meshes with a worm wheel 58 attached to one face of the drum cam 60 which in turn is splined upon the shaft 61, the operation of the cam 60 being identical in both forms of the invention illustrated. The cam follower 65 which is carried by the shaft 66 journaled in roller bearings 67 and 68 in the slide 31, follows the cam groove 64 formed in the cam 60. Since the shaft 61 rotates in a clockwise direction (looking from the right hand end of the shaft 61 in Fig. 19), the cam follower 65 will move to the left, thus effecting the advance of the slide 31 toward the fixture 250.

The condition just described is illustrated more fully in the pattern view of the drum cam 60, shown in Fig. 24. As there indicated, the advance of the slide 31 will continue until such time as the cam follower 65 reaches the uppermost portion of the groove 64, as shown in Fig. 24. Continued rotation of the drum in the direction indicated by the arrow will result in retracting the tool carrying slide 31, thereby effecting the return stroke of the cutters. Further rotation of the cam then results in a dwell of the slide in its retracted position. The shaft 61, on which the drum cam 60 is splined, carries the spur gear 252 which transmits driving power to the mating spur gear 253, which is anchored to the end face of the drum cam 254. The cam follower 257, which is carried by the shaft 258 mounted in roller bearings 259 in the fixture slide 260, lies within the cam groove 256 formed in the cam 254. Rotation of the drum cam 254 in a counter-clockwise direction results in the following cycle of operation for the slide 260.

Fig. 25 of the drawings illustrates a pattern view of the drum cam 254 with the cam follower 257 shown at the left hand end of the cam groove 256. The slide 260 has been moved to its advanced position, as shown in Fig. 19, and remains in this position until such time as the cam follower 257 reaches the point where the cam groove 256 turns upward (as shown in Fig. 25) at which time the slide 260 is retracted. As the cam continues its rotation, the follower 257 will advance along the downward curve of the groove 256, which results in the advance of the slide 260 to its forward position.

The ring cam 261, which is adjustably mounted on the opposite end face of the drum cam 254, effects a vertical clamping pressure upon the key or workpiece by reason of its action upon the cam follower 265 through movement of the pin 267, the arm 270, the arm 272, push rod 275, bell crank 278, tie rod 282, arm 284, pinion 288, and rack 289, to effect the downward movement of the pressure foot 291 upon the workpiece supported on the surface 292 of the slide 260. A pattern view of this cam is illustrated in Fig. 26 of the drawings. The cam follower 265 is shown in a position identical with that shown in Fig. 19, wherein the pressure foot 291 is in key clamping position. As the cam 261 advances to the left (in Fig. 26) the cam follower 265 will drop to a lower face portion of the cam, which effects movement of the linkage just described to lift the key from contact with the supporting surface 292 under the action of the extracting pin 293 which is in frictional contact with a suitable aperture formed in the workpiece to cause the key to be elevated. The key remains in a slightly elevated position until such time as the cam follower 265 reaches the end of the last named surface of the cam 261, where it again drops to a lower surface to effect continued upward movement of the rack 289. The continued upward movement of the rack 289 further elevates the pin 293, which results in contact between the key and a stripper element which is bifurcated to span the pin 293. The contact between the key and the stripper element effects a release of the frictional contact between the pin 293 and the key or workpiece, thus permitting it to fall freely into a suitable chute, from which it is discharged to an accessible tray or pan removably mounted on the bed of the machine. Continued movement of the cam 264 results in outward movement of the cam follower 265 to again exert clamping pressure on a new workpiece, which has been advanced with the slide 260 of the fixture 250. The cam 294 effects a lateral clamping action upon the key or workpiece by means of movement of the cam follower 297, sliding block 300, rocking action of the bell crank 306, which effects longitudinal movement of members 310, 311, push rods 313, sliding blocks 315', rocking action of connecting links 316, and the pivotal movement of jaws 319, which cooperate with a fixed jaw 320 to retain the key against lateral movement. The key is clamped against longitudinal movement by means of the spring-urged plunger 321 which is urged forward through action of the lug 322 carried by sliding member 315' and supporting the connecting pin 323. This longitudinal clamping pressure retains the key tightly upon the pin 293.

From the foregoing detailed description of the cycle of operation, movement of the key or workpiece may easily be comprehended by reference to the mechanism shown in Fig. 19. The keys or workpieces may be loaded manually into the magazine 109 which is preferably of duplex form to increase the capacity of the machine. As the slide 260 of the fixture 250 is retracted to its rearward position through co-action between the cam follower 257 and the cam groove 256, the weight of the keys is sufficient to cause the lowermost key to drop onto the supporting face 292 formed on the forward portion of the slide 260. As the slide is advanced under action of the cam follower 257, the key is moved forward to the extreme position illustrated in Fig. 19. As the key reaches the position shown, the pressure foot 291 is urged downwardly by the action of the rack 289 to exert a clamping pressure upon the key or workpiece. Simultaneously with the effecting of the clamping pressure, the locating pin 293 enters an aperture formed in the workpiece to insure proper positioning of the workpiece upon the supporting face 292. After the vertical clamping pressure and positioning operation has been completed, the cam 261 effects rocking movement of the clamping jaw 319 to exert lateral pressure upon the key to retain it against lateral movement during the cutting operation. Simultaneously with this last named pressure application, and under action of the same cam 261, axial pressure is applied to the key through the pressure foot 321 to retain the same in clamped position upon the locating pin 293.

Upon the completion of the positioning and clamping actions just described, the tool supporting slide is advanced under action of the cam groove 64 in the drum cam 60. The cutting action of the cutters 39 continues from the time they contact the key until the farthest point of advance, which is determined by the throw of the cam groove 64. The key or workpiece remains clamped until such time as the cutters 39 have been retracted with the slide 31 under action of the drum cam 69. Upon completion of the retraction of the cutters from the workpiece, the lateral and longitudinal clamping pressures upon the key are released through action of the cam follower 297 upon the cam 294. The vertical pressure of the clamping foot 291 is then released, and continued upward movement of the rack 289 results in contact between the workpiece and the stripper foot, thus causing the key to be dislodged from its position upon the locating or extracting pin 293. The slide 260 is then retracted to its extreme position wherein the lowermost key of each stack in the magazine 109 drops into position on the work-supporting surface 292 formed on the forward end of the slide 260. This action completes a single cycle of operation, and continued operation of the machine effects repeated cycles of operation as long as workpieces are supplied to the magazine.

From the foregoing, it will readily be understood that a new and improved key milling or grooving machine has been provided wherein workpieces such as key blanks or the like are advanced from a loading magazine, clamped in desired located positions, and retained fixed against movement under the action of advancing cutters, released upon retraction of the cutters, and unloaded or discharged from the workpiece fixture upon completion of the grooving operation upon the workpiece.

While the machines referred to in the foregoing specification are particularly adapted for performing the grooving operation in lock keys, it is to be understood that a similar cycle of operation may well be effected upon any type of relatively thin workpieces, which present a serious problem with regard to effecting simple clamping arrangements exerting sufficient pressure thereon to withstand the rapid and rather severe strain of the action of a cutting tool. It should also be noted that novel means has been provided for effecting the loading of workpieces onto a movable workpiece fixture, and also that there has been provided novel means for unloading workpieces from a movable fixture after the cutting operation has been completed.

While the several embodiments of the invention have been described in considerable detail in the foregoing specification, it is to be understood that various changes may be made in its embodiments without departing from or sacrificing any of the advantages thereof and without departing from the spirit and scope of the invention as defined by the subjoined claims.

The invention is hereby claimed as follows:

1. In a machine tool having a base, the combination with a movable tool support and a movable work support, of a source of power, a motion transmitting gear train connectible with said power source to effect relative movement between said tool and work supports, a work holding magazine, cam actuated means for effecting transfer of workpieces from said magazine to said work support, cam actuated workpiece clamping means on said work support adapted to releasably retain workpieces thereon, cam actuated means for advancing the tool support toward the work support, means for positioning the clamped workpieces in alignment with the path of travel of the tool support, and means for removing workpieces from said work support after completion of the cutting action of the tool.

2. In a milling machine adapted for use in cutting grooves in relatively thin workpieces, the combination with a movable support for a tool spindle and a movable work support, of a motion transmitting gear train for effecting relative movement of said tool and work supports, a work holding magazine, cam actuated means for effecting transfer of workpieces from said magazine to said work support, cam actuated workpiece clamping means on said work support adapted to releasably retain workpieces thereon, cam actuated means for effecting reciprocating movement of said movable tool spindle support, means for positioning the clamped workpieces in the path of the reciprocating tool, and means for removing finished workpieces from the work support.

3. In a milling machine adapted for automatic operation to groove workpieces, the combination with an indexible work support and a reciprocable tool support, of a source of power, motion transmitting means connectible with said power source and said tool and work supports to effect relative movement therebetween, a workpiece loading station adjacent to said indexible work support, an unloading station adjacent to said work support, cam actuated means for effecting transfer of workpieces from said loading station to said work support, cam actuated workpiece clamping means on said work support adapted to releasably retain workpieces thereon, cam actuated means for effecting reciprocatory movement of said tool support in timed relationship with the indexing of said work support to successively present clamped workpieces in the path of the moving cutting tool, and cam actuated means for removing finished workpieces from the work support at said unloading station.

4. In a machine tool having a base, the combination with a tool supporting element slidably mounted on said base and a work support movable with respect to said base, of a power source, a motion transmitting means connectible with said power source and said tool and work supports, workpiece loading means actuated by movement of said tool support adapted to place workpieces on said work support, workpiece clamping means adapted to releasably retain workpieces on said work support, means for effecting movement of said work support to position clamped workpieces in the path of travel of the tool, means for effecting reciprocating motion of said tool support to effect cutting action on the workpiece, and means for removing finished workpieces from said work support.

5. In a machine tool having a base, the combination with a tool supporting element slidably mounted on the base and a work support movable with respect to the base, of a power source, a motion transmitting means connectible with said power source and said tool and work supports, workpiece loading means adapted to place workpieces on said work support, workpiece clamping means adapted to releasably retain workpieces on said work support, means for effecting movement of said work support to position clamped workpieces in the path of travel of the tool, means for effecting reciprocating motion to said tool support to effect cutting action on the workpiece, and workpiece unloading means actuated by movement of said tool support adapted to remove finished workpieces from the work support.

6. In a machine tool having a base, the combination with a tool supporting element slidably mounted on the base and a work support movable with respect to the base, of a power source, a motion transmitting means connectible with said power source and said tool and work supports, workpiece loading means actuated by movement of said tool support adapted to place workpieces on said work support, workpiece clamping means adapted to releasably retain workpieces on said work support, means for effecting movement of said work support to position clamped workpieces in the path of travel of the tool, means for effecting reciprocating motion to said tool support to effect cutting action on the workpiece, and workpiece unloading means actuated by movement of said tool support adapted to remove finished workpieces from the work support.

7. In a milling machine having a base, the combination with a cutter supporting element carrying a rotary cutter, and a work supporting element, said elements being arranged on said base in manner to have relative cutting movement, of means on said work supporting element for rigidly supporting a workpiece in cooperating relationship with said cutter, means responsive to relative cutting movement of said elements to release and to discharge said workpiece automatically after a cutting operation has been completed, and means to automatically feed into and clamp in said work supporting element a new workpiece for a subsequent cutting operation.

8. In an automatic milling machine having a base, the combination with a cutter supporting element carrying a rotary cutter and a work supporting element, said elements being arranged to have relative movement on said base to effect a cutting action, of a magazine, means responsive to relative movement of said cutter and work supporting elements for feeding a workpiece from said magazine to said work supporting element, workpiece clamping means for engaging and releasably retaining said workpiece in cooperating relationship with said cutter, and means responsive to relative movement of said cutter and work supporting elements for discharging workpieces from said work support after the cutting operation has been completed.

9. In an automatic milling machine having a base, the combination with a cutter supporting element carrying a rotary cutter and a work supporting element, said elements being arranged to have relative movement on said base to effect a cutting action, of a magazine, cam actuated means responsive to relative movement between said cutter and work supporting elements for feeding a workpiece from said magazine to said work supporting element, cam actuated workpiece clamping means for releasably retaining said workpiece in cooperating relationhip with said cutter, and cam actuated means responsive to relative movement between said cutter and work supporting elements for effecting automatic discharge of said workpiece from said work support after the cutting operation is completed.

10. In a work holding mechanism for a machine tool, the combination with a work support movable to a plurality of positions, of means for feeding a workpiece to said support at one of said positions, clamping means arranged to resiliently hold the workpiece on said support, a cutter for engaging the workpiece at another of said positions, and additional clamping means disposed to exert further clamping pressure on the workpiece while it is in the cutting position to support it rigidly for engagement by said cutter.

11. In a work-withdrawing mechanism for a machine tool, the combination with a work clamp including clamping members resiliently pressed toward each other for clamping a workpiece therebetween and means for feeding a work-piece into clamping position between said clamping member, of mechanism for withdrawing a finished workpiece from between said clamping members including a wedge element disposed to be forced between said members to disengage them from the workpiece and an extractor element movable with said wedge element to grip said workpiece when it is thus disengaged, and means to retract said extractor and said wedge, said retracting means including a lost motion mechanism arranged to provide for withdrawal of said extractor and workpiece prior to withdrawal of said wedge element from between said clamping members.

12. In an automatic key milling machine, the combination with a frame and a cutter carrying head slidably mounted on said frame, of a work carrying turret rotatably mounted on said frame, a plurality of key clamping elements in said turret, actuating mechanism for moving said slidably mounted head through a cutting stroke in cooperative relationship with said work carrying turret and for synchronously indexing said turret to present keys in the several clamping elements successively for engagement by cutters in said head, means for automatically inserting keys to be milled into said clamping elements at a position angularly spaced from said cutting position, control means disposed between said key inserting position and said cutting position for gauging said keys and operative to stop said actuating mechanism in the event of improper loading of a clamping element, means for automatically discharging said keys from said turret after they have been milled, and control means disposed between said key discharging position and said key inserting position and operative to stop said actuating mechanism in the event of failure to discharge a key.

13. In a machine tool of the continuously operating type, the combination with a work-supporting fixture adapted to receive successive workpieces, and a cutter disposed to operate upon a workpiece while being held in said supporting fixture, of automatic means for loading a workpiece into said fixture and for discharging said workpiece therefrom after a cutting operation, a gauge disposed to engage the workpiece in said fixture prior to a cutting operation, and means responsive to the position of said gauge and operative to stop said machine in the event that said gauge is so positioned as to indicate that said workpiece exceeds a predetermined thickness, whereby possible damage to the machine may be avoided.

14. In a machine tool of the continuously operating type, the combination with a work-supporting fixture adapted to receive successive workpieces, and a cutter disposed to operate upon a workpiece while being held in said supporting fixture, of automatic means for loading a workpiece into said fixture and for discharging said workpiece therefrom after a cutting operation, a gauge disposed to engage said fixture prior to a loading operation, and means responsive to the position of said gauge and operative to stop said machine in the event that said gauge is so positioned as to indicate that said fixture is not clear for receiving a workpiece, whereby possible damage from an improperly loaded fixture may be avoided.

15. In a machine tool of the continuously operating type, the combination with a work-supporting fixture adapted to receive successive workpieces, and a cutter disposed to operate upon a workpiece while being held in said supporting fixture, of automatic means for loading a workpiece into said fixture and for discharging said workpiece therefrom after a cutting operation, a gauge disposed to engage said fixture prior to a loading operation, means responsive to the position of said gauge and operative to stop said machine in the event that said gauge is positioned to indicate that said fixture is not ready to receive a workpiece, another gauge disposed to engage the workpiece in said fixture after a loading operation and prior to a cutting operation, and means responsive to the position of said second gauge and operative to stop said machine in the event that said second gauge is positioned to indicate that said workpiece is not adapted to be engaged by said cutter, whereby injury to said machine from an improperly loaded workpiece may be obviated.

16. In a machine tool, a cutter, a fixture for holding a workpiece in position to be engaged by said cutter, and means for feeding a workpiece into said fixture comprising a movable workpiece carrying member disposed to position said workpiece approximately and, a subsequently acting striking member disposed to impinge upon said workpiece and drive it into predetermined position in said fixture.

17. In a machine tool, the combination with a cutter and a fixture for holding a workpiece in position to be engaged by said cutter, of means for loading a workpiece into said fixture including a workpiece moving member arranged to position a workpiece adjacent to its final position in said fixture, a spring urged setting member, and means arranged to release said setting member upon said workpiece being moved to the position adjacent to said fixture to permit said setting member to impinge upon said workpiece and drive it into its final position in said fixture.

18. In an automatic milling machine, a work holding structure, a tool supporting structure mounted for movement relative to said work holding structure, work clamping means mounted on said work holding structure, and actuating means associated with said tool supporting structure and operative upon movement of said tool supporting structure relative to said work holding structure to effect operation of said work clamping means.

19. An automatic machine tool comprising means for receiving and clamping workpieces, means for actuating a cutting tool in cooperating relationship with the workpieces in said clamping means, and means responsive to the position of said clamping means and operative to render said actuating means inactive when said clamping means is so positioned as to indicate improper clamping of workpieces.

20. In an automatic milling machine, means for holding a workpiece, comprising a resiliently urged clamping member, means movable relative to said clamping member and operative to perform a milling operation upon the workpiece held therein, and workpiece removing means arranged to function subsequent to the operation of said milling means and including a clamp releasing member disposed to engage said resiliently urged clamping member to force it out of engagement with the workpiece to permit its removal.

21. In an automatic milling machine, means for holding a workpiece, comprising a resiliently urged clamping member, means movable relative to said clamping member and operative to perform a milling operation upon the workpiece held therein, and workpiece removing means movable relative to said clamping member in timed relationship with said milling means for functioning subsequent thereto, said removing means including a wedging member disposed to engage said resiliently urged clamping member in manner to release it from clamping engagement with the workpiece, gripping means disposed to grip the workpiece simultaneously with its release by said wedging member, and retracting means including lost-motion mechanism arranged to withdraw said gripping means together with the workpiece and subsequently to withdraw said wedging member.

22. In an automatic milling machine, the combination with work supporting means having a plurality of work receiving positions, and means for moving said work supporting means in manner to present the various positions successively, of loading mechanism disposed to load workpieces into said successive positions as they are presented, milling means arranged to operate upon the workpieces in said positions successively, power driven means disposed to actuate said work support moving means and said milling means, means for removing the workpieces from said positions after they have been operated upon by said milling means, and control means including a device arranged to engage said positions prior to presentation to said loading mechanism and a second device arranged to engage said positions subsequent to the loading operation, said devices being responsive respectively to improper removal of the finished workpieces and improper loading of new workpieces and operative in either of said events to deenergize said driving means.

JOSEPH B. ARMITAGE.
JOSEPH J. LENERT.